United States Patent
Waters

(10) Patent No.: US 7,475,956 B2
(45) Date of Patent: *Jan. 13, 2009

(54) APPARATUS FOR PRINTING, DATA WRITING TO MEMORY TAGS AND DATA READING FROM MEMORY TAGS, AND METHODS THEREFOR

(75) Inventor: John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

This patent is subject to a terminal disclaimer.

(21) Appl. No.: 10/697,319

(22) Filed: Oct. 31, 2003

(65) Prior Publication Data

US 2004/0100381 A1 May 27, 2004

(30) Foreign Application Priority Data

Nov. 21, 2002 (GB) .................................. 0227201.1

(51) Int. Cl.
*H04K 1/00* (2006.01)
*B41J 3/00* (2006.01)

(52) U.S. Cl. .................. 347/2; 340/572.1; 340/10.1; 340/10.2; 340/572.2; 340/568.1; 156/64; 156/384

(58) Field of Classification Search ..................... None
See application file for complete search history.

(56) References Cited

U.S. PATENT DOCUMENTS

| | | | |
|---|---|---|---|
| 5,497,140 A * | 3/1996 | Tuttle ........................ 340/10.1 |
| 6,163,260 A * | 12/2000 | Conwell et al. .......... 340/572.8 |
| 6,280,544 B1 * | 8/2001 | Fox et al. ...................... 156/64 |
| 6,597,465 B1 * | 7/2003 | Jarchow et al. ............ 358/1.12 |
| 6,645,327 B2 * | 11/2003 | Austin et al. .................. 156/64 |
| 6,857,714 B2 * | 2/2005 | Hohberger et al. ............. 347/2 |
| 6,969,134 B2 * | 11/2005 | Hohberger et al. ............. 347/2 |
| 7,137,000 B2 * | 11/2006 | Hohberger et al. .......... 713/168 |
| 7,227,721 B1 * | 6/2007 | Kientz et al. ................. 360/132 |
| 2002/0186406 A1 * | 12/2002 | Phillips et al. ............. 358/1.15 |
| 2004/0080774 A1 * | 4/2004 | Owen et al. ................ 358/1.14 |
| 2005/0080460 A1 * | 4/2005 | Wang et al. ................... 607/17 |

FOREIGN PATENT DOCUMENTS

| | | |
|---|---|---|
| JP | 2001-96814 | 4/2001 |
| JP | 2002-2026 | 1/2002 |
| WO | WO 98/05508 | 2/1998 |
| WO | WO 98/39734 | 9/1998 |

* cited by examiner

*Primary Examiner*—Twyler L. Haskins
*Assistant Examiner*—Pawandeep S Dhingra

(57) ABSTRACT

Apparatus for data printing and data writing to a memory tag on or in a base medium is described. The apparatus includes a print head for printing onto the base medium, and a memory tag write device for data writing to the memory tags on or in the base medium. The base medium is moved along a first axis through or past the apparatus. At least a part of the memory tag write device required for communication with the memory tags is moveable relative to the base medium back and forth along a second axis substantially perpendicular to the first axis. The print head may be moveable relative to the base medium such that it moves back and forth along a third axis substantially perpendicular to the first axis, depending on the printing technology concerned.

13 Claims, 6 Drawing Sheets

APPARATUS FOR PRINTING, DATA WRITING TO MEMORY TAGS AND DATA READING FROM MEMORY TAGS, AND METHODS THEREFOR

FIELD OF THE INVENTION

The invention relates to printing apparatus, and in particular to such apparatus which in addition to printing can write data to memory tags on or in the paper or other base medium being printed onto, and to a method of doing so, and which can read data from memory tags on or in the paper or other base medium.

BACKGROUND OF THE INVENTION

Memory tags in the form of Radio Frequency Identification (RFID) tags are well known in the prior art. RFID tags come in many forms but all comprise an integrated circuit on which in use information can be stored and a coil which enables it to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-onchip" technology in which the coil required for the inductive link is on the chip rather than attached to it. This results in a memory tag in the form of a chip of 2.5 mm square, which operates at 13.56 MHz. This chip is capable of both being read and being written to. In addition Hitachi has developed a memory tag they call a "mu-chip" which is a chip of 0.4 mm square and operates at 2.45 GHz. This chip is written with data during the manufacturing process in Read-Only-Memory (ROM), but is small enough to be embedded in paper.

The invention provides assistance in making practical use of the developments in RFID technology, and indeed in any other memory tag technologies.

SUMMARY OF THE INVENTION

According to the first aspect of the present invention there is provided apparatus for data printing and data writing to a memory tag on or in a base medium, the apparatus having a print head for printing onto the base medium, and a memory tag write device for data writing to the memory tags on or in the base medium, wherein the base medium is moved along a first axis through or past the apparatus, and at least a part of the memory tag write device required for communication with the memory tags is moveable relative to the base medium back and forth along a second axis substantially perpendicular to the first axis.

BRIEF DESCRIPTION OF THE DRAWINGS

Embodiments of apparatus according to the invention will now be described, by way of example only, with reference to the accompanying drawings, in which.

DETAILED DESCRIPTION OF THE PREFERRED EMBODIMENTS

Figure 1:
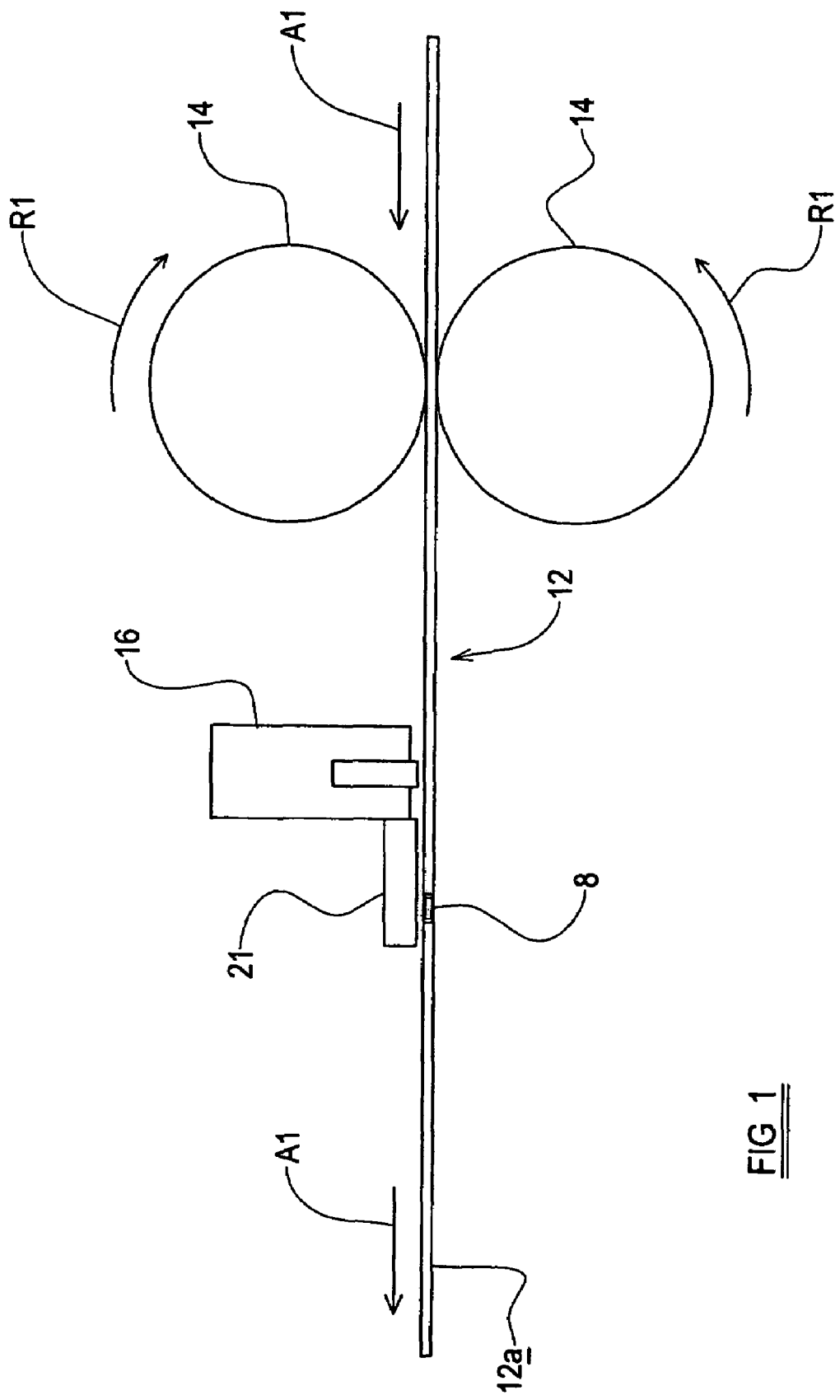
FIG. 1 is a schematic of the main elements of a first embodiment of apparatus according to the invention from the side.
Figure 2:
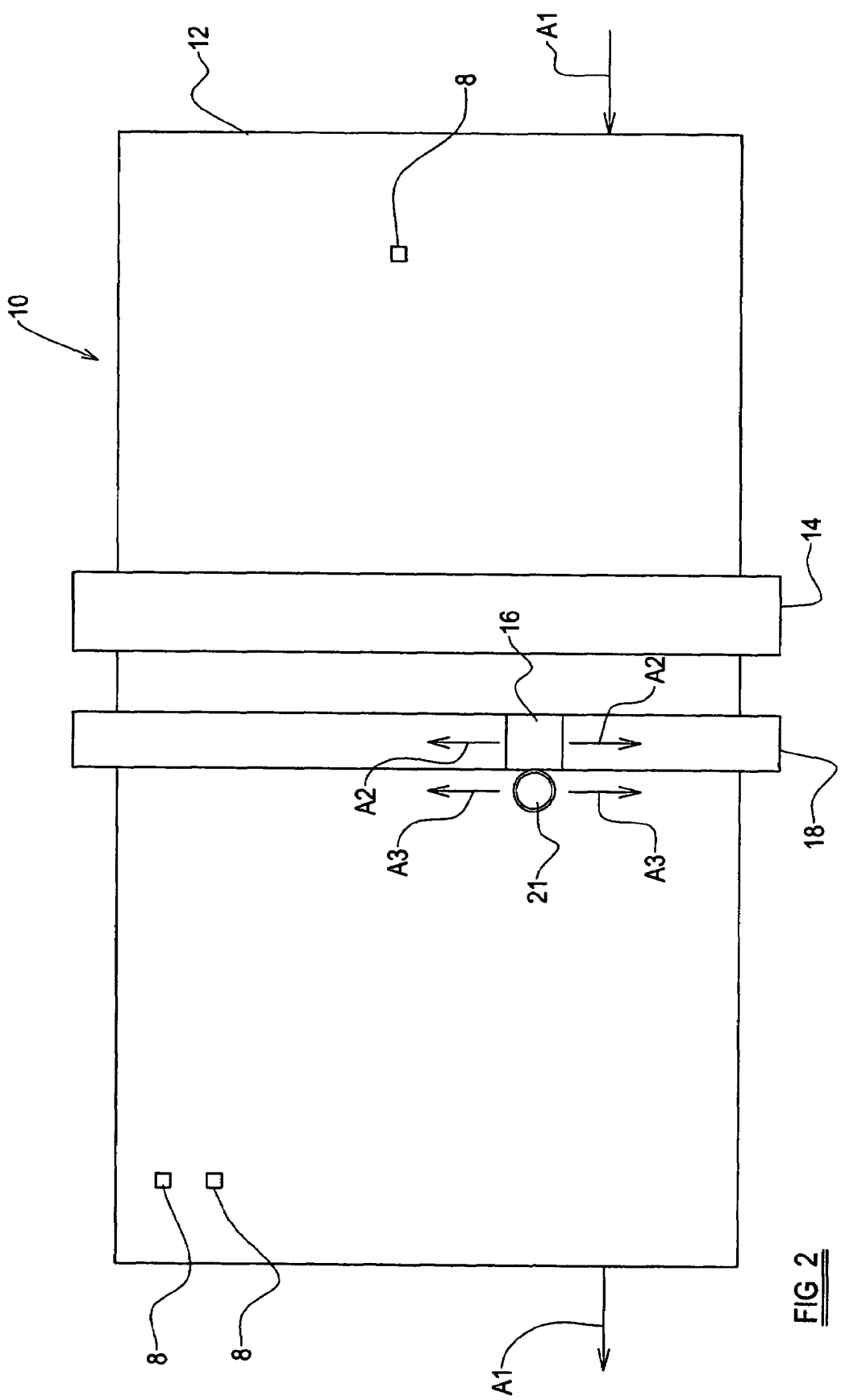
FIG. 2 is a schematic of the apparatus of FIG. 1 from above.

Referring to FIGS. 1 and 2, apparatus 10 for printing onto a base medium and data writing to a memory tag in or on the base medium is illustrated. This embodiment is for use with a base medium in the form of loose sheet paper 12, to which memory tags 8 have been applied or within which memory tags 8 have been embedded (as shown in FIG. 1). The memory tags 8 are RFID memory tags for which the manner of writing data to the tags and reading data from the tags is well known (see for example the RFID Handbook, Klaus Finkenzeller, 1999, John Wiley & Sons). For simplicity only those parts of the apparatus 10 which need to be shown to describe the invention are illustrated and described. It will be understood that the apparatus 10 includes much known technology from the prior art of printers, and from the prior art of RFID memory tags, which is not described here.

The apparatus 10 includes paper feed rollers 14 which are driven to rotate as indicated by arrows R1 to feed the loose paper sheets 12 through the apparatus 10 along a first axis in the direction indicated by arrows A1.

The apparatus 10 further includes a print head 16, which in this example is of ink jet form, mounted on a print head carriage 18 which extends across the apparatus 10 substantially perpendicular to the axis A1. The print head 16 is moveable back and forth along the print head carriage 18, in known manner. Thus the print head 16 is moveable back and forth along an axis indicated by arrows A2, substantially perpendicular to the axis A1, to enable the print head 16 to access most of the upper surface 12a of the paper sheet 12 as it moves through the apparatus 10, and thus to print anywhere on that accessible area of surface 12a as required.

The apparatus 10 also includes a memory tag read/write device 20 which operates in known manner to write data to and/or read data from memory tags as required using an inductive coil 21. The inductive coil 21 of the memory tag read/write device 20 is connected to the print head 16 for movement back and forth along the print head carriage 18 with the print head 16. Thus the inductive coil 21 is moveable back and forth along an axis indicated by arrows A3, substantially perpendicular to the axis A1, and parallel to the axis A2, to enable the memory tag read/write device 20 to read data from and/or write data to memory tags 8 located anywhere on or in the accessible area of the paper sheet 12, as will be described further below.

Figure 3:
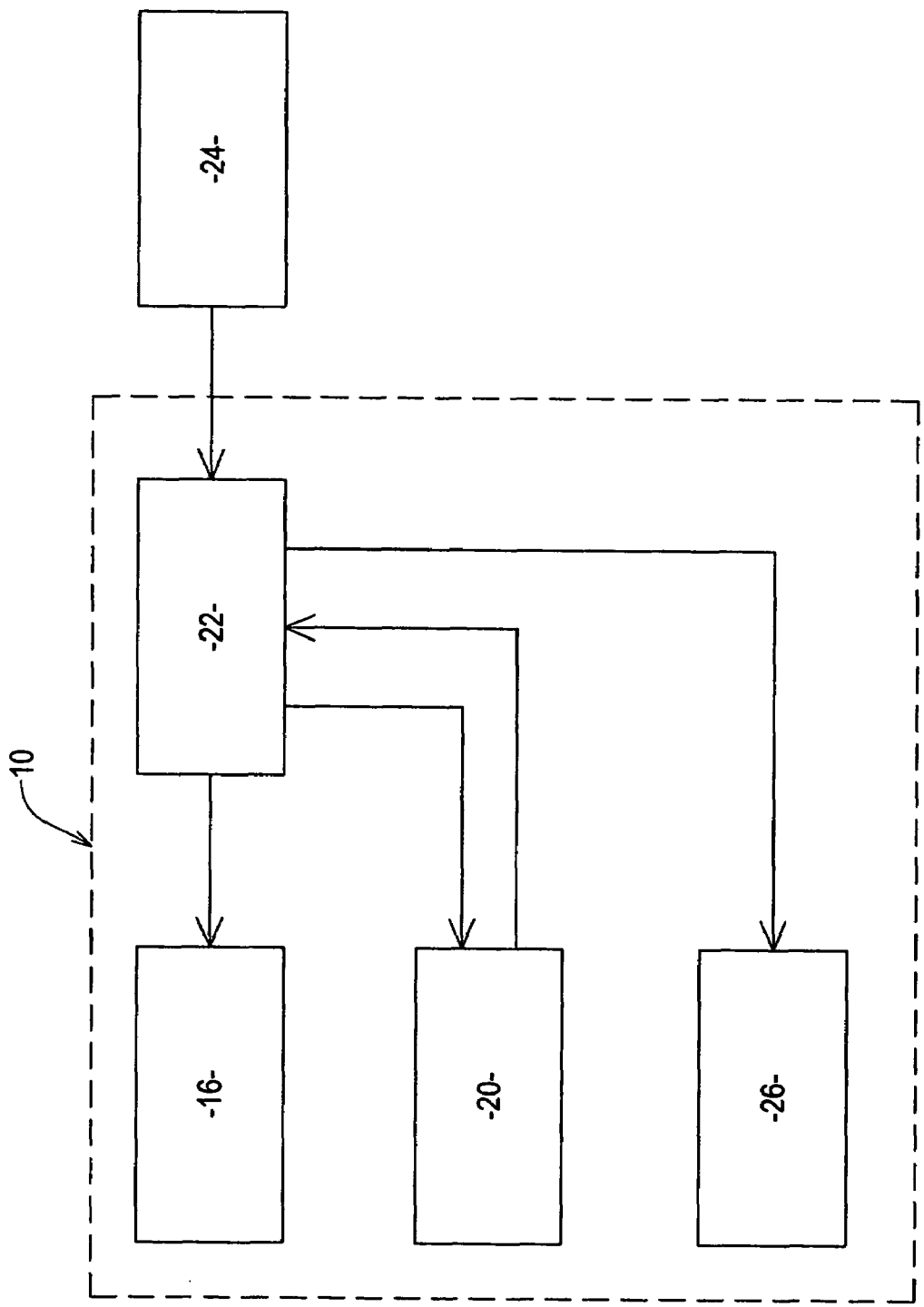
FIG. 3 is a block diagram of the control of the apparatus according to the invention.

Referring now also to FIG. 3, the apparatus 10 also includes a main processor 22 and a mechanics controller 26, which controls all the mechanical operations of the apparatus 10, (i.e. the paper feed rollers 14, the movement of the print head 16 and inductive coil 21 along the print head carriage 18). The main processor 22 receives instruction signals from a host computer 24, including the details of:

what to print;

where to print it;

where the memory tag 8 is or tags 8 are in/on the paper sheet 12; and what data to write to the memory tag(s) 8.

The main processor 22 sends command signals as required to:
the mechanics controller;
the print head 16; and
the memory tag read/write device 20, to implement the instruction signals.

Thus the paper sheet 12 is fed through the apparatus 10 and has the required information printed on its upper surface 12a. At the same time the memory tags 8 on or within the paper sheet 12 have the necessary data written to them by the memory tag read/write device 20, with the movement of the memory tag read/write device 20 (and print head 16) being paused with the memory tag read/write device 20 over the or each memory tag 8 as necessary for the data writing to take place.

The manner of co-ordination of the printing and data writing processes will depend on a number of factors. If, for example, the memory tags 8 are only present adjacent the top and/or bottom of the paper sheet 12 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 12.

It is likely that the memory tags 8 will be read in future both by further apparatus which can scan the paper sheet 12 to locate the memory tags 8 and by hand held readers. Thus in order to assist users in the future to locate the memory tags 8 on the paper sheet 12 the memory tags 8 may have icons printed over their locations which can be readily identified by users.

The memory tag read/write device 20 may, in addition to writing the data to the memory tags 8, also conduct a read operation to check that the data has written successfully before the paper sheet 12 is moved on following the data write operation. Alternatively, particularly if the apparatus 10 is operating at high speed, a separate data check device (not shown) may be included in the apparatus such that this operation takes place downstream of a memory tag write device which in this case need not also be capable of data reading.

As the apparatus 10 is capable of both writing data to memory tags 8 in or on a base medium, and reading data from such memory tags 8, it can also be used to read data stored in memory tags 8 in or on previously printed sheets of paper 12. Thus such a sheet of paper 12 may be fed into the apparatus 10 set in "read" mode by the operator, and the contents of the or each memory tag 8 in or on the sheet paper will then be read into a memory portion of the main processor 22 of the apparatus 10. The data may then be passed to the host computer 24. However, the data in the memory tag 8 may, for example, comprise an electronic version of the printed matter on the sheet of paper 12, thus enabling the apparatus 10 to produce one or more copies of that printed matter without the need to scan the printed matter, and hence such copies should be free from the kinds of errors that may be generated by scanning. This may be of particular use where the printed matter is a photograph, which over a period of time may fade, or otherwise deteriorate, such that it cannot be copied adequately by conventional techniques. The data stored in the memory tag 8 would effectively be a digital "negative" enabling fresh copies of the photograph to be produced after an extended period of time.

Furthermore, the data could be sent to the host computer 24, altered in some way, such as editing of a word processed document, or digital manipulation of a photograph, and then the data could be sent back to the apparatus 10 to be printed and stored in another memory tag 8 in its altered form.

Figure 6:
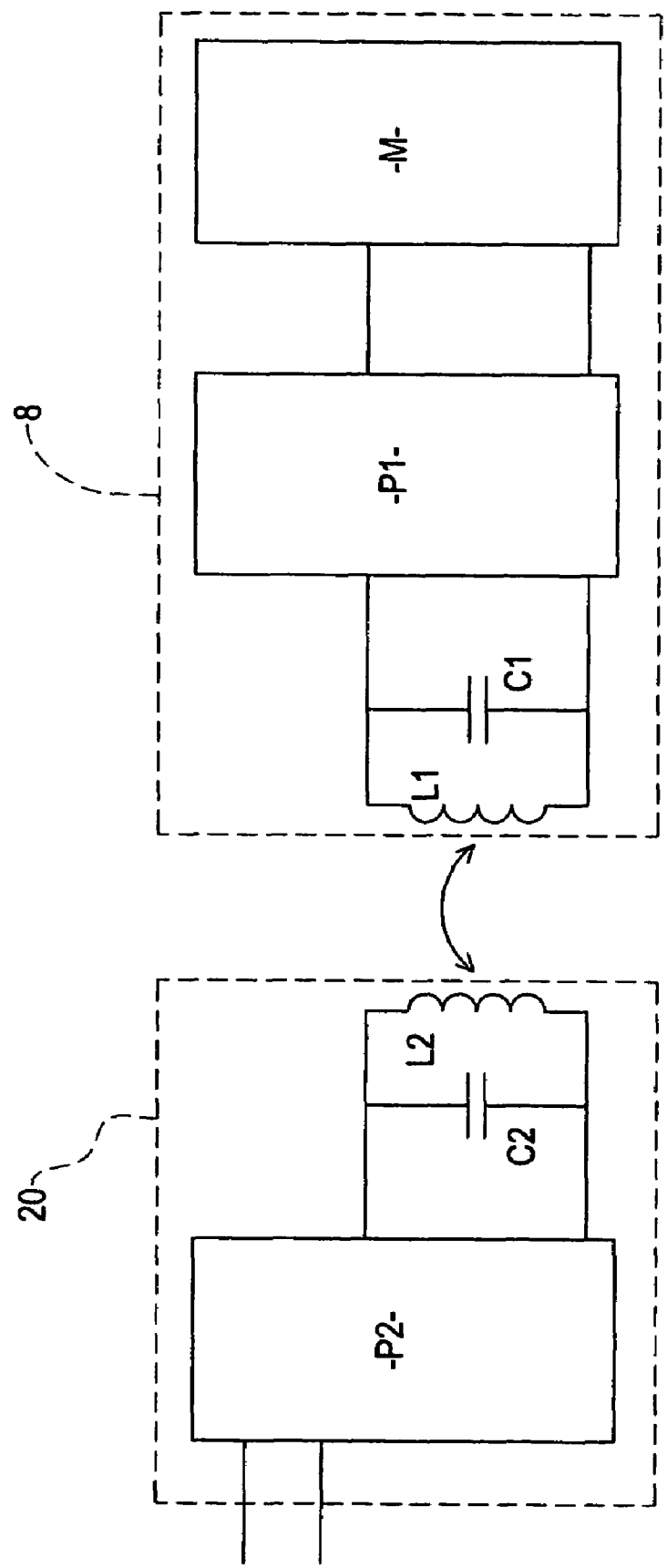
FIG. 6 is a schematic of a memory tag and read/write device as incorporated in any embodiment of the invention.

Referring now to FIG. 6 the basic operation of the memory tags 8 and of the read/write device 20 will be described. The memory tag 8 includes an antenna coil L1 and a capacitor C1 connected in parallel therewith to form a resonant circuit. It further includes a memory M and processing and power circuit P1. The read/write device 20 includes an antenna coil L2 and a capacitor C2 in parallel therewith to form a resonant circuit, and a processing and signal generating circuit P2.

A signal generator with in P2 generates a signal at the chosen frequency, such as 2.45 GHz, this is applied to the antenna coil L2 and thus generates an electro-magnetic field which, provided the memory tag 8 is sufficiently close to the read/write device 20, penetrates the antenna coil L1 of the memory tag 8. By induction a voltage is thus generated in the antenna coil L1, this is rectified in circuit P1 and used to power the memory tag 8. The capacitance of the capacitors C1 and C2 is selected such that the resonant circuits are both resonant at the frequency generated by the signal generator, in order to maximise transmitted signal strength and received signal.

When data is to be written to the memory tag 8 by the read/write device 20 the radio frequency signal generated in P2 is modulated, e.g. amplitude modulated, with the data before being applied to the antenna coil L2 and transmitted. The signal received by the memory tag 8 by inductive coupling thus both powers the memory tag 8 and communicates with it, the circuit P1 separating the data signal from the carrier and passing data for storage to the memory M.

Similarly, if data is to be read from the memory tag 8 the circuit P1 applies a signal indicative of the data to the antenna coil L1 which is detected, as a result of the inductive coupling, by antenna coil L2 and deciphered in circuit P2 before being passed from the read/write device 20 to main processor 22 of the apparatus 10. This signal may for example be transmitted using load modulation. In RFID systems such as this the power consumed by the memory tag 8 can be measured as a drop in voltage across the internal resistance of the antenna coil L2 of the read/write device 20. A load resistance within the circuit P1 may be switched on and off, thus altering the power consumed by the memory tag 8 which is then detected as an amplitude modulation of the voltage across the antenna coil L2 of the read/write device 20.

Figure 4:
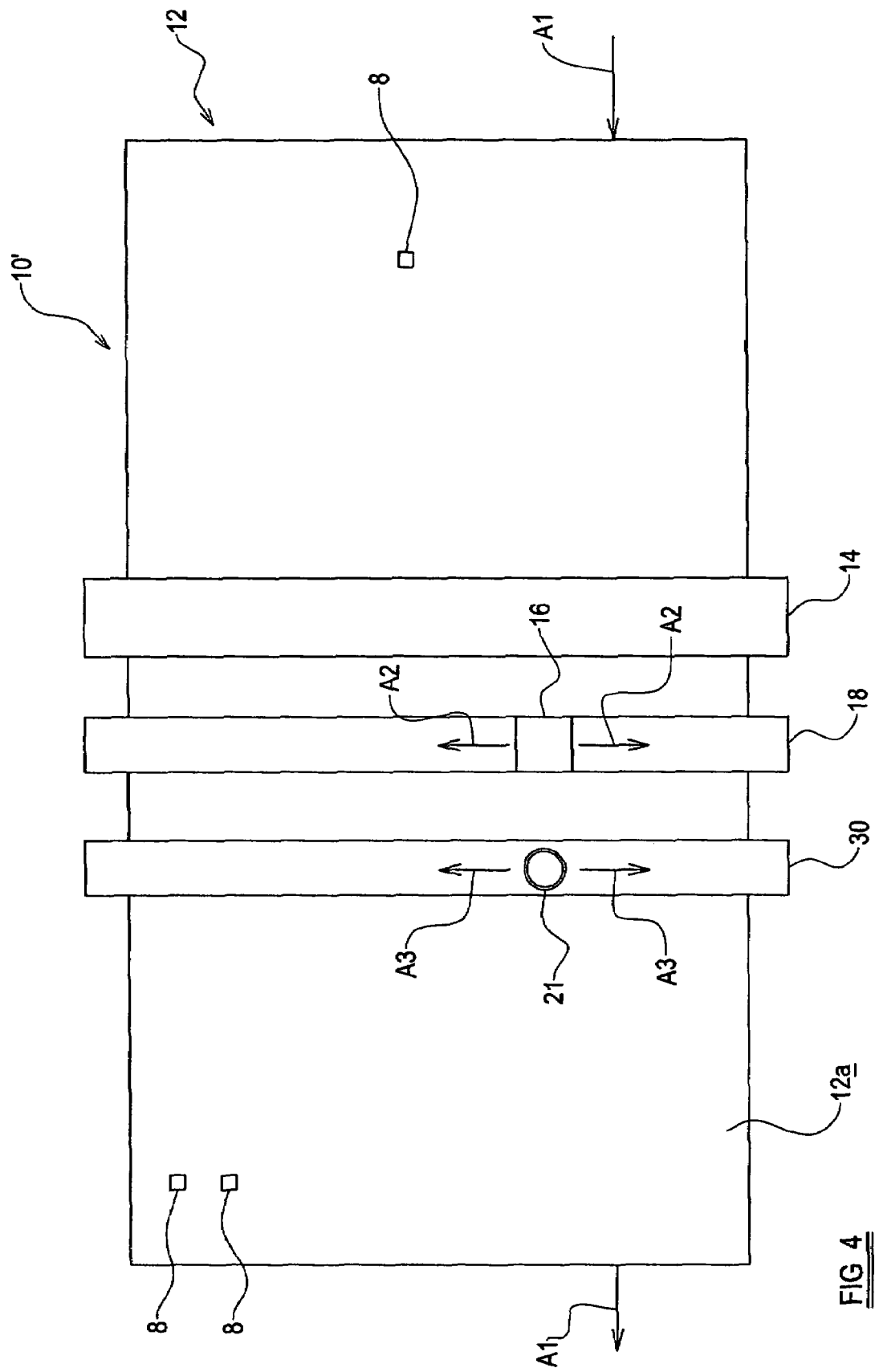
FIG. 4 is a schematic of the main elements of a second embodiment of apparatus according to the invention from above.

For the apparatus 10 in which the print head 16 and memory tag read/write device move in unison, a practical embodiment would incorporate the inductive coil 21 into the print head 16, with the control circuits located within a fixed portion of the apparatus 10. In such embodiments the axes A2 and A3 will be coincident Although the print head 16 is described as being of ink jet form, the invention can be implemented with many different forms of print head and indeed many different forms of printer. For some forms of printer it may be appropriate for the memory tag read/write device 20 to be moveable independently of the print head 16, as shown in FIG. 4, rather than these units being connected together for movement as one or indeed amalgamated into a single unit. In this alternative embodiment of apparatus 10' the memory tag read/write device 20 is mounted on a read/write device carriage 30 for independent movement along the axis A3. The read/write device carriage 30 is shown downstream of the print head carriage 18, but could alternatively be located upstream of it, such that the data read/write to the memory tag(s) 8 takes place ahead of the printing onto the base medium. Such embodiments still fall within the scope of this invention.

Figure 5:
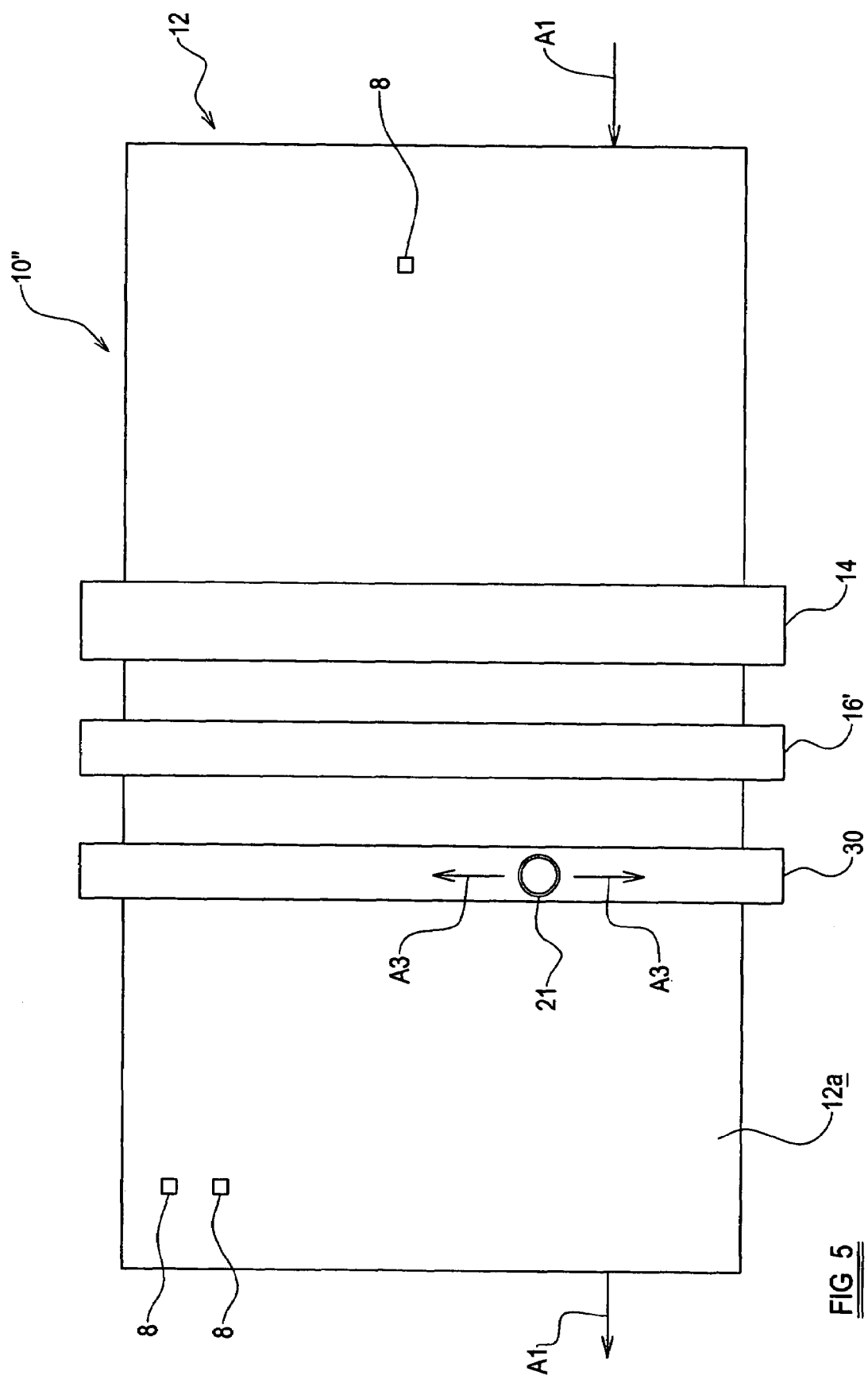
FIG. 5 is a schematic of the main elements of a second embodiment of apparatus according to the invention from above.

In other forms of printer 10", as illustrated schematically in FIG. 5, the print head 16' spans the width of the paper 14 and does not move side to side in order to achieve the necessary print coverage. This form of printer 10" therefore does not include a print carriage, but other parts common to the printers 10 and 10' previously described are like referenced. This embodiment might involve laser printers, and other forms of printing technology, in which the print heads are fixed within the apparatus and do not move relative to the base medium or other wise.

The embodiments of apparatus 10, 10' and 10"; have been described as appropriate for use with paper sheets 12. However, embodiments of the invention may also be constructed for use with other base media, for example paper in fan fold or roll form, other sheet materials, or indeed boxes or other packages passing underneath, rather than through, the apparatus according to the invention on some kind of conveyor.

The invention is described in use with RFID memory tags, but apparatus according to the invention may be constructed for use with other forms of memory tag which operate at other frequencies, outside the radio frequency range.

The apparatus of the invention provides a significant advantage over the prior art in that data can be written to one or more memory tags on a base medium, at the same time that data is printed onto the base medium. This enables much more rapid production of documents etc. with data in both visible and electronic form stored on them.

The invention claimed is:

1. Apparatus for data printing and data writing to a memory tag on or in a base medium, the apparatus having a print head for printing onto the base medium, and a memory tag write device for data writing to the memory tag on or in the base medium, wherein the base medium is moved along a first axis through or past the apparatus, and at least a part of the memory tag write device required for communication with the memory tag is moveable relative to the base medium back and forth along a second axis substantially perpendicular to the first axis.

2. Apparatus according to claim 1 wherein the print head is moveable relative to the base medium and moves back and forth along a third axis substantially perpendicular to the first axis.

3. Apparatus according to claim 2 wherein the print head and the part of the memory tag write device are connected together and move in unison along the second and third axis.

4. Apparatus according to claim 3 wherein the print head and the part of the memory tag write device are amalgamated into a single unit and the second and third axis coincide.

5. Apparatus according to claim 2 wherein the print head and the part of the memory tag write device move independently along the second and third axis.

6. Apparatus according to claim 1 wherein the memory tag write device is a memory tag read/write device, such that the data written to the memory tags can be read and checked after being written.

7. Apparatus according to claim 1 wherein the memory tag write device is a memory tag read/write device, such that data written to memory tags on previously printed base medium can be read from those memory tags when the previously printed base medium is moved through or past the apparatus.

8. Apparatus according to claim 7 wherein the data once read is used to print additional copies of the previously printed base medium.

9. Apparatus according to claim 1 wherein it is adapted to handle base medium in loose sheet form which passes through the apparatus.

10. Apparatus according to claim 9 wherein it is adapted to handle loose sheets of paper or like material.

11. Apparatus for data printing onto a base medium and data writing to a memory tag on or in the base medium, the apparatus having a print head for printing onto the base medium, and a memory tag write device for data writing to the memory tag, wherein the base medium is moved along a first axis through or past the apparatus, the print head is moveable relative to the base medium and moves back and forth along a third axis substantially perpendicular to the first axis, and at least a part of the memory tag write device which is required for communication with the memory tag is moveable relative to the base medium back and forth along a second axis substantially perpendicular to the first axis.

12. A method of printing onto a base medium and writing to a memory tag on or in the base medium comprising the steps of:
   i) feeding the base medium along a first axis past a print head;
   ii) printing onto the base medium;
   iii) feeding the base medium past a memory tag write device;
   iv) moving the memory tag write device along a second axis substantially perpendicular to the first axis to the location of a memory tag in or on the base medium, and
   v) writing data to the memory tag in or on the base medium.

13. A method according to claim 12 wherein it further includes the step of moving the print head relative to the base medium along a third axis substantially perpendicular to the first axis in order to print onto the base medium in required locations.

* * * * *